United States Patent
Xu et al.

(10) Patent No.: US 10,247,898 B2
(45) Date of Patent: Apr. 2, 2019

(54) METHOD OF LAYING OPTICAL FIBER AND TRANSFER APPARATUS FOR WINDING OPTICAL FIBER

(71) Applicant: Tyco Electronics (Shanghai) Co. Ltd., Shanghai (CN)

(72) Inventors: Liangliang Xu, Shanghai (CN); Junfeng Wang, Shanghai (CN); Xingze Wang, Shanghai (CN); Lizhang Yang, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 0 days.

(21) Appl. No.: 15/611,005

(22) Filed: Jun. 1, 2017

(65) Prior Publication Data

US 2017/0269320 A1    Sep. 21, 2017

Related U.S. Application Data

(63) Continuation of application No. PCT/IB2015/059300, filed on Dec. 2, 2015.

(30) Foreign Application Priority Data

Dec. 4, 2014  (CN) .......................... 2014 1 0727072

(51) Int. Cl.
*G02B 6/00* (2006.01)
*G02B 6/44* (2006.01)
(Continued)

(52) U.S. Cl.
CPC .......... *G02B 6/4459* (2013.01); *B65H 75/16* (2013.01); *B65H 75/28* (2013.01); *B65H 75/40* (2013.01);
(Continued)

(58) Field of Classification Search
CPC .. G02B 6/4452; G02B 6/3897; G02B 6/4471; G02B 6/4446; G02B 6/4457; G02B 6/00; G02B 6/4464
See application file for complete search history.

(56) References Cited

U.S. PATENT DOCUMENTS

| 4,151,965 A | 5/1979 | Manabe |
| 5,796,908 A * | 8/1998 | Vicory ................. G02B 6/4454 |
| | | 385/135 |

(Continued)

FOREIGN PATENT DOCUMENTS

| EP | 0135132 A1 | 3/1985 |
| EP | 0296860 A1 | 6/1988 |
| WO | 2006043744 A1 | 4/2006 |

OTHER PUBLICATIONS

PCT International Preliminary Report on Patentability, dated Jun. 6, 2017, 8 pages.

(Continued)

*Primary Examiner* — Jennifer Doan
(74) *Attorney, Agent, or Firm* — Barley Snyder

(57) ABSTRACT

A method of laying an optical fiber comprises providing a continuous optical fiber, a first segment of optical-electrical hybrid cable having a first fiber receiving tube, and a second segment of optical-electrical hybrid cable having a second fiber receiving tube. The optical fiber is laid into the first fiber receiving tube using an air-blowing device. A leading end of the optical fiber is fixed in a transfer apparatus after the leading end passes through an outlet of the first fiber receiving tube. A portion of the optical fiber which has passed through the first segment is wound in the transfer apparatus until the optical fiber is completely laid in the first segment. The leading end of the optical fiber is detached from the transfer apparatus. The portion of the optical fiber
(Continued)

which has passed through the first segment is laid into the second fiber receiving tube using the air-blowing device.

6 Claims, 11 Drawing Sheets

(51) Int. Cl.
*B65H 75/16* (2006.01)
*B65H 75/28* (2006.01)
*G02B 6/52* (2006.01)
*H02G 1/08* (2006.01)
*B65H 75/40* (2006.01)
*B65H 75/44* (2006.01)
*H01B 11/22* (2006.01)
*H01B 13/00* (2006.01)

(52) U.S. Cl.
CPC ..... *B65H 75/4465* (2013.01); *B65H 75/4471* (2013.01); *G02B 6/4416* (2013.01); *G02B 6/4464* (2013.01); *G02B 6/4485* (2013.01); *G02B 6/52* (2013.01); *H01B 11/22* (2013.01); *H01B 13/0003* (2013.01); *H02G 1/086* (2013.01); *B65H 2701/32* (2013.01)

(56) References Cited

U.S. PATENT DOCUMENTS

2007/0189694 A1 8/2007 Mullaney et al.
2009/0304341 A1* 12/2009 Shimirak ............. H02G 15/013
385/135

OTHER PUBLICATIONS

PCT Written Opinion and Search Report, dated Mar. 4, 2016, 11 pages.

* cited by examiner

METHOD OF LAYING OPTICAL FIBER AND TRANSFER APPARATUS FOR WINDING OPTICAL FIBER

CROSS-REFERENCE TO RELATED APPLICATIONS

This application is a continuation of PCT International Application No. PCT/IB2015/059300, filed on Dec. 2, 2015, which claims priority under 35 U.S.C. § 119 to Chinese Patent Application No. 201410727072.6, filed on Dec. 4, 2014.

FIELD OF THE INVENTION

The present invention relates to a method for laying optical fiber and, more particularly, to a method for laying a long continuous optical fiber into fiber receiving tubes of a plurality of segments of optical-electrical hybrid cables.

BACKGROUND

Known air-blowing devices for laying or blowing optical fibers are only capable of laying a certain length of optical fiber for each use of the air-blowing device. When the length of an optical fiber to be laid is larger than that of an optical fiber that can be laid by the air-blowing device in a single use, it is necessary to successively blow the optical fiber having a larger length into fiber receiving tubes of segments of optical-electrical hybrid cables. Each segment of the optical-electrical hybrid cables has a length less than or equal to that of the optical fiber that can be laid by the air-blowing device in a single use.

For example, if there is an air-blowing device which can only lay an optical fiber of at most 500 meters, when an optical fiber of 3 kilometers must be laid, the air-blowing device needs to repeatedly blow this optical fiber of 3 kilometers into fiber receiving tubes of six segments of optical-electrical hybrid cables, each segment of optical-electrical hybrid cable having a length of 500 meters. Firstly, the optical fiber of 3 kilometers is laid into a fiber receiving tube of a first segment of optical-electrical hybrid cable by the air-blowing device. Next, the remaining optical fiber of 2500 meters which has passed through the first segment of optical-electrical hybrid cable is laid into a fiber receiving tube of a second segment of optical-electrical hybrid cable. Next, the remaining optical fiber of 2000 meters which has passed through the second segment of optical-electrical hybrid cable is laid into a fiber receiving tube of a third segment of optical-electrical hybrid cable, and so on, until a remaining optical fiber of 500 meters which has passed through the fifth segment of optical-electrical hybrid cable is laid into a fiber receiving tube of a sixth segment of optical-electrical hybrid cable. The entire 3 kilometers of optical fiber is thus laid.

In the prior art, after the air-blowing device has blown a leading end of the optical fiber to enter an inlet of the fiber receiving tube of the first segment and exit an outlet thereof, an operator grasps the leading end of the optical fiber and winds the optical fiber which has passed through the first segment around an existing fiber disk. The operator winds the optical fiber until laying of the optical fiber in the first segment is completed. The wound fiber is then taken out of the fiber disk by the operator, the fiber is turned 180° over, and the fiber is then wound around the fiber disk again. Subsequently, the operator finds the leading end of the optical fiber and mounts the leading end onto the air-blowing device, the remaining optical fiber of 2500 meters which has passed through the first segment of optical-electrical hybrid cable is then laid into a fiber receiving tube of a second segment of optical-electrical hybrid cable. After laying the optical fiber into the second segment is completed, the remaining optical fiber of 2000 meters is laid into the fiber receiving tubes of the third, fourth, fifth and sixth segments of optical-electrical hybrid cables successively.

In laying a long optical fiber according to the prior art, the leading end of the optical fiber is not fixed in the fiber disk, but rather is freely received in the fiber disk. The optical fiber is extremely likely to become disordered and to be self-wound when the optical fiber is taken out of the fiber disk, turned over, and rewound. Once the optical fiber becomes disordered or self-wound, it may be damaged during the blowing, and the optical fiber may need to be replaced and re-laid with a new optical fiber.

SUMMARY

An object of the invention, among others, is to provide a method of laying an optical fiber which is capable of laying a long continuous optical fiber into fiber receiving tubes of a plurality of segments of optical-electrical hybrid cables without the fiber becoming disordered or self-wound. A method of laying an optical fiber according to the invention comprises providing a continuous optical fiber, a first segment of optical-electrical hybrid cable having a first fiber receiving tube, and a second segment of optical-electrical hybrid cable having a second fiber receiving tube. The optical fiber is laid into the first fiber receiving tube using an air-blowing device. A leading end of the optical fiber is fixed in a transfer apparatus after the leading end passes through an outlet of the first fiber receiving tube. A portion of the optical fiber which has passed through the first segment is wound in the transfer apparatus until the optical fiber is completely laid in the first segment. The leading end of the optical fiber is detached from the transfer apparatus. The portion of the optical fiber which has passed through the first segment is laid into the second fiber receiving tube using the air-blowing device.

BRIEF DESCRIPTION OF THE DRAWINGS

The invention will now be described by way of example with reference to the accompanying figures, of which.

DETAILED DESCRIPTION OF THE EMBODIMENTS

Figure 1A:
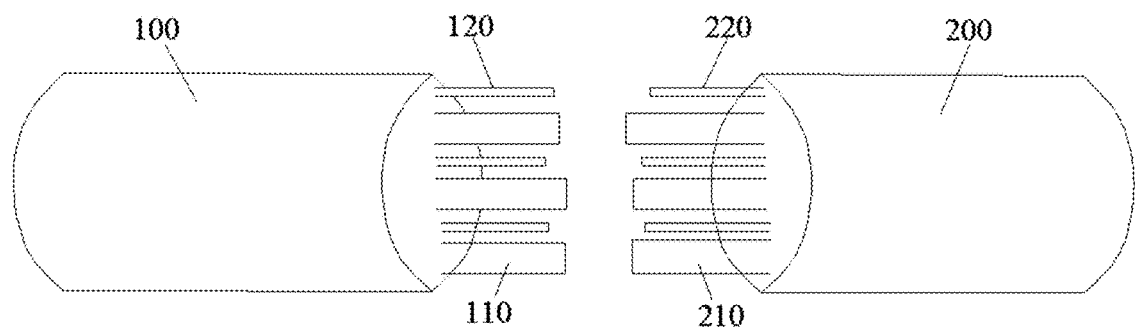
FIG. 1A is a side view of a first segment of optical-electrical hybrid cable and a second segment of optical-electrical hybrid cable according to the invention separated from each other.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein; rather, these embodiments are provided so that the present disclosure will be thorough and complete, and will fully convey the concept of the disclosure to those skilled in the art.

A first segment of optical-electrical hybrid cable 100 and a second segment of optical-electrical hybrid cable 200 according to the invention are shown separated in FIG. 1A. Each segment 100, 200 has at least one power cable 110, 210 and at least one fiber receiving tube 120, 220.

Figure 1B:
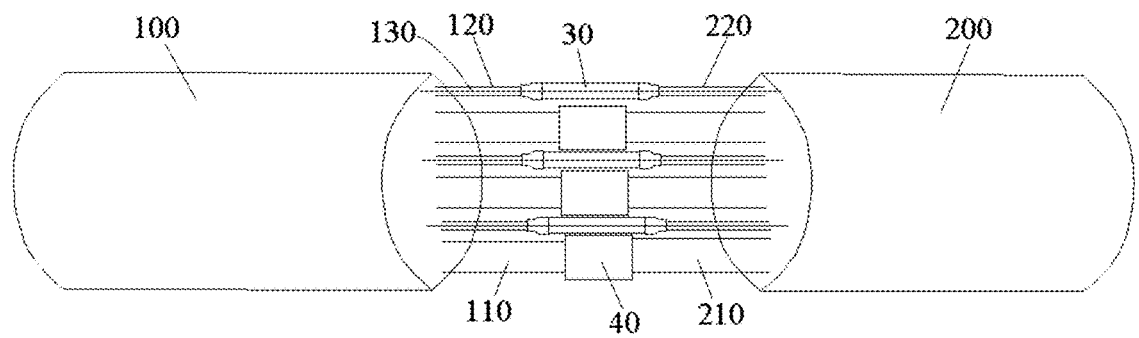
FIG. 1B is a side view of the first segment and the second segment connected with each other.

As shown in FIG. 1B, the power cables 110, 210 may be connected with each other by a cable connector 40. In the shown embodiment, the cable connector 40 is a metal pressure joint. The continuous optical fiber 130 passes through and is housed in two corresponding fiber receiving tubes 120, 220 of the two segments 100, 200, and the two fiber receiving tubes 120, 220 are connected with each other by a tube connector 30.

Figure 2A:
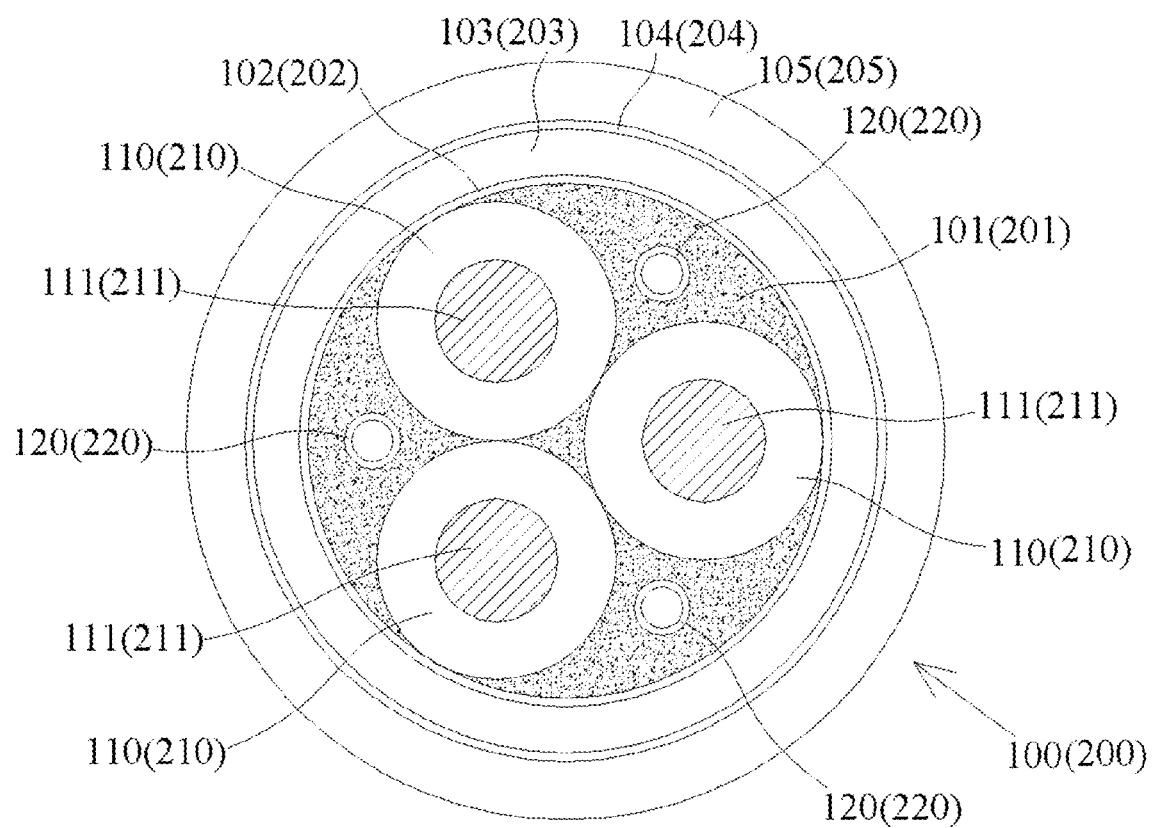
FIG. 2A is a sectional view of the first segment and second segment.
Figure 2B:
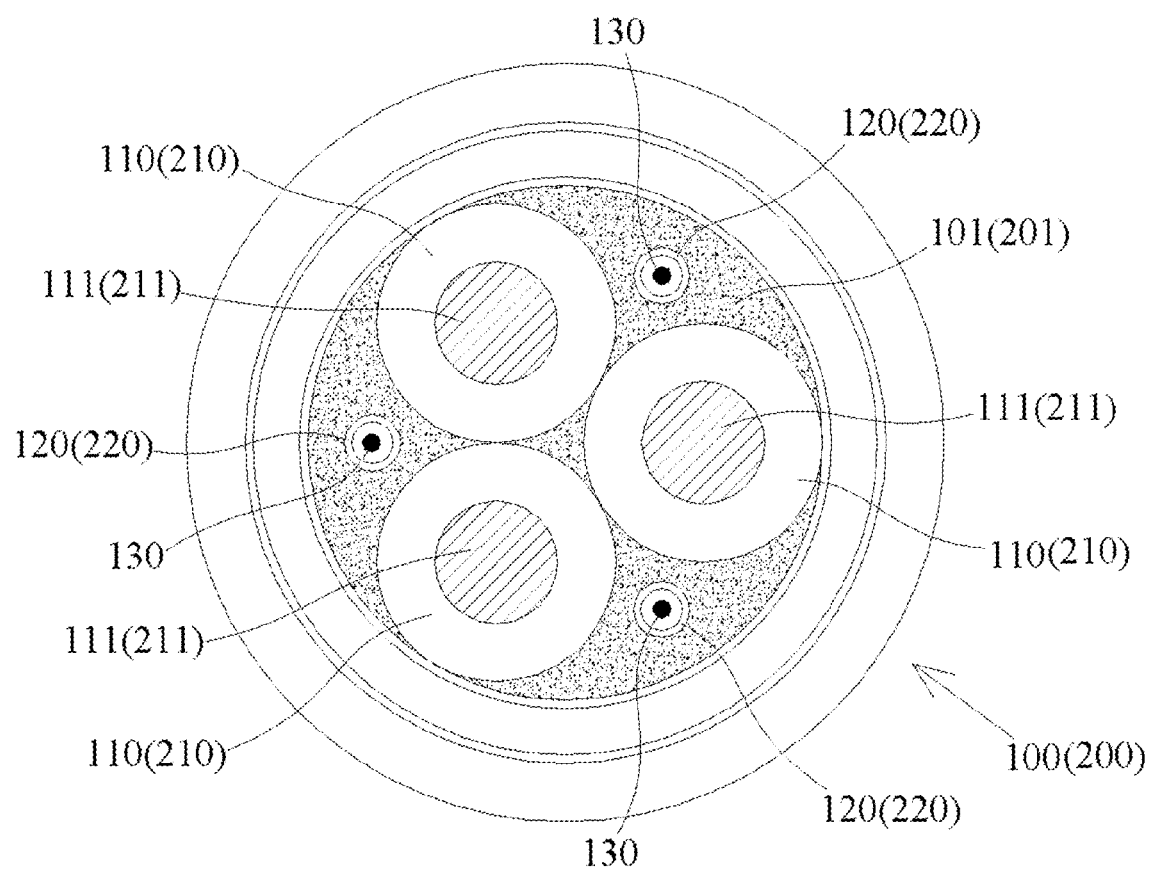
FIG. 2B is a sectional view of the first segment and the second segment with an optical fiber inserted into a fiber receiving tube.

The segments 100, 200 of optical-electrical hybrid cable without the optical fibers 130 inserted into the fiber receiving tubes 120, 220 are shown in FIG. 2A. The segments 100, 200 of optical-electrical hybrid cable with the optical fibers 130 inserted into the fiber receiving tubes 120, 220 are shown in FIG. 2B. In the embodiment shown in FIGS. 2A and 2B, the first segment 100 and the second segment 200 have a same internal structure. In other embodiments, the first segment 100 and the second segment 200 may have different internal structures.

As shown in FIGS. 2A and 2B, the first segment 100 has three first power cables 110 and three first fiber receiving tubes 120. As shown clearly in FIG. 2A, the three first power cables 110 are intertwined with each other with their outer circumferences being tangential to each other. Each first power cable 110 comprises a conductor core 111, an insulation material layer (not shown) wrapped around the conductor core 111, and a metal shielding layer (not shown) wrapped around the insulation material layer. A first metal shielding layer 102 is wrapped around the three first power cables 110, and an insulation filling material 101 is filled into gaps between the first metal shielding layer 102 and the three first power cables 110. When manufacturing the first segment of optical-electrical hybrid cable 100, the three first fiber receiving tubes 120 are embedded in the insulation filling material 101. The first segment 100 has a first insulation layer 103 wrapped around the first metal shielding layer 102, a second metal shielding layer 104 wrapped around the first insulation layer 103, and an outer sheath layer 105 wrapped around the second metal shielding layer 104.

Similarly, as shown in FIGS. 2A and 2B, the second segment 200 has three second power cables 210 and three second fiber receiving tubes 220. The three second power cables 210 are intertwined with each other with their outer circumferences being tangential to each other. Each second power cable 210 comprises a conductor core 211, insulation material layer (not shown) wrapped around the conductor core 211, and a metal shielding layer (not shown) wrapped around the insulation material layer. A first metal shielding layer 202 is wrapped around the three second power cables 210, and an insulation filling material 201 is filled into gaps between the first metal shielding layer 202 and the three second power cables 210. When manufacturing the second segment 200, the three second fiber receiving tubes 220 are embedded in the insulation filling material 201. The second segment 200 has a first insulation layer 203 wrapped around the first metal shielding layer 202, a second metal shielding layer 204 wrapped around the first insulation layer 203, and an outer sheath layer 205 wrapped around the second metal shielding layer 204.

The structure of the segments 100, 200 is not limited to the embodiment shown in FIGS. 2A and 2B. For example, each segment 100, 200 may comprise one, two, four, or more fiber receiving tubes 120, 220, or one, two, four or more power cables 110, 210.

A method of laying the continuous optical fiber 130 into the fiber receiving tubes 120, 220 of the two segments of optical-electrical hybrid cables 100, 200 will now be described in detail with reference to FIGS. 3A-3N.

Figure 3A:
FIG. 3A is a side view of a first step of a method of laying the optical fiber into the first segment and the second segment.

First, as shown in FIG. 3A, the first segment 100 and the second segment 200 of optical-electrical hybrid cables as described above are provided.

Figure 3B:
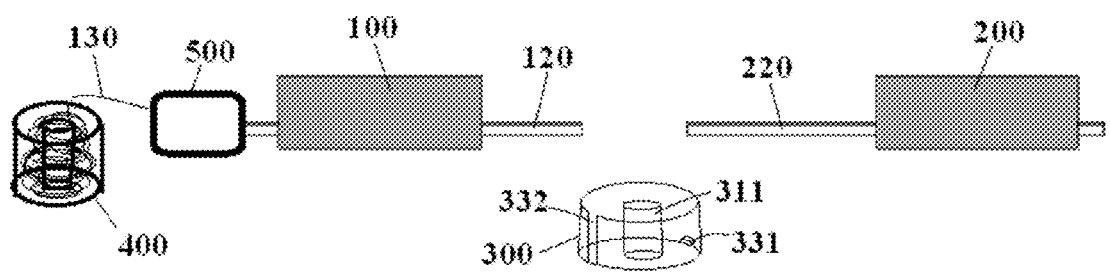
FIG. 3B is a side view of a next step of the method of laying the optical fiber into the first segment and the second segment.

Next, as shown in FIG. 3B, the long continuous optical fiber 130 wound in a fiber disk 400 is blown into the first fiber receiving tube 120 of the first segment 100 by an air-blowing device 500.

Figure 3C:
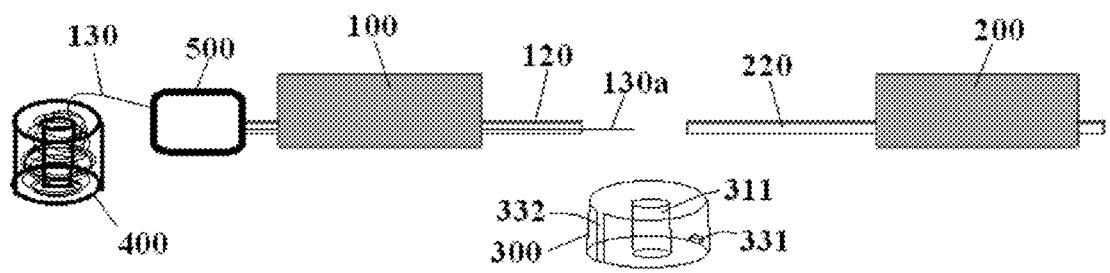
FIG. 3C is a side view of a next step of the method of laying the optical fiber into the first segment and the second segment.
Figure 3D:
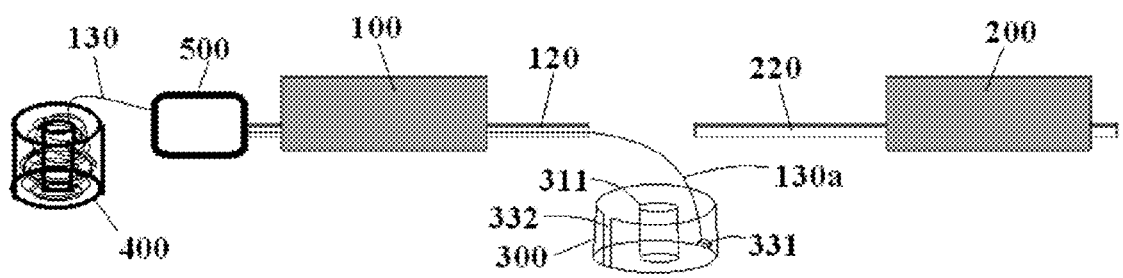
FIG. 3D is a side view of a next step of the method of laying the optical fiber into the first segment and the second segment.

Next, as shown in FIGS. 3C and 3D, a leading end 130a of the optical fiber 130 is fixed onto a fiber fixation device 331 of a transfer apparatus 300 after the leading end 130a of the optical fiber 130 comes out from an outlet of the first fiber receiving tube 120.

Figure 3E:
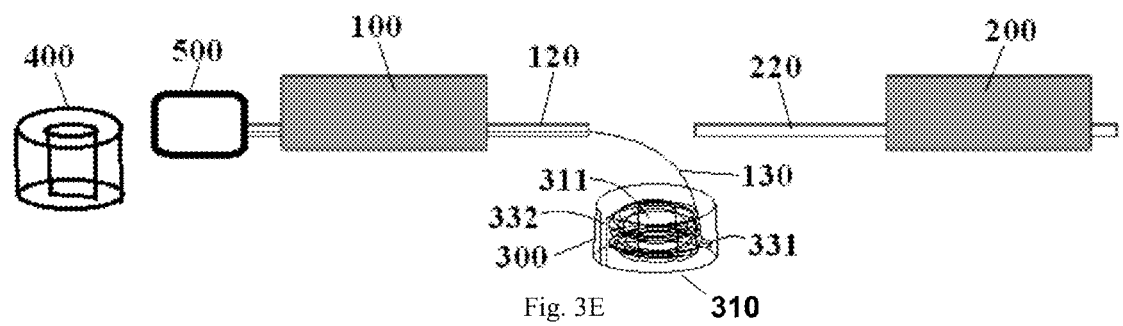
FIG. 3E is a side view of a next step of the method of laying the optical fiber into the first segment and the second segment.

Next, as shown in FIG. 3E, the optical fiber 130 is blown continuously into the first fiber receiving tube 120 while winding the remaining optical fiber 130 which has passed through the first fiber receiving tube 120 around a first protrusion cylinder 311 provided on a lower cover 310 of the transfer apparatus 300. The optical fiber 130 is blown until it is completely laid in the first fiber receiving tube 120.

Figure 3F:
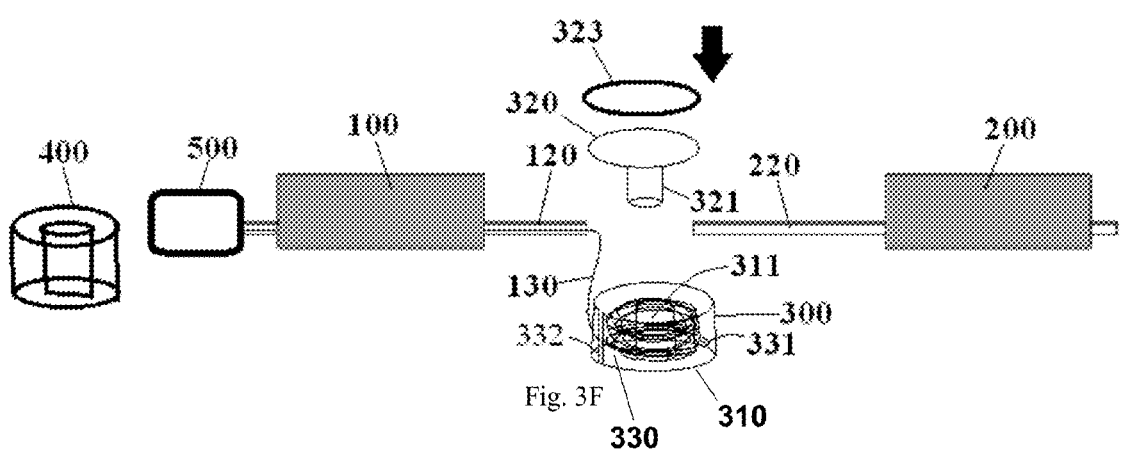
FIG. 3F is a side view of a next step of the method of laying the optical fiber into the first segment and the second segment.
Figure 3G:
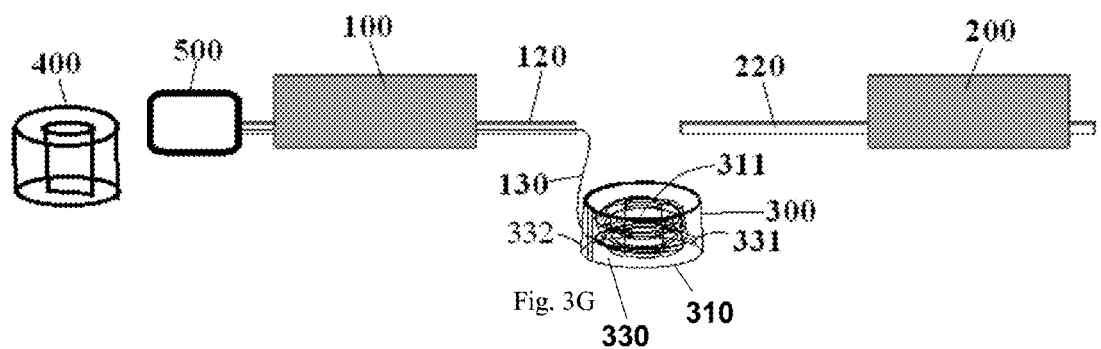
FIG. 3G is a side view of a next step of the method of laying the optical fiber into the first segment and the second segment.

Next, as shown in FIGS. 3F and 3G, the optical fiber 130 is moved into a slit 332 of a cylindrical body 330 of the transfer apparatus 300, and an upper cover 320 of the transfer apparatus 300 is arranged to cover the cylindrical body 330, and is clamped to the cylindrical body 330 by an upper clamping ring 323. A second protrusion cylinder 321 provided on the upper cover 320 is inserted into a central bore of the first protrusion cylinder 311 provided on the lower cover 310.

Figure 3H:
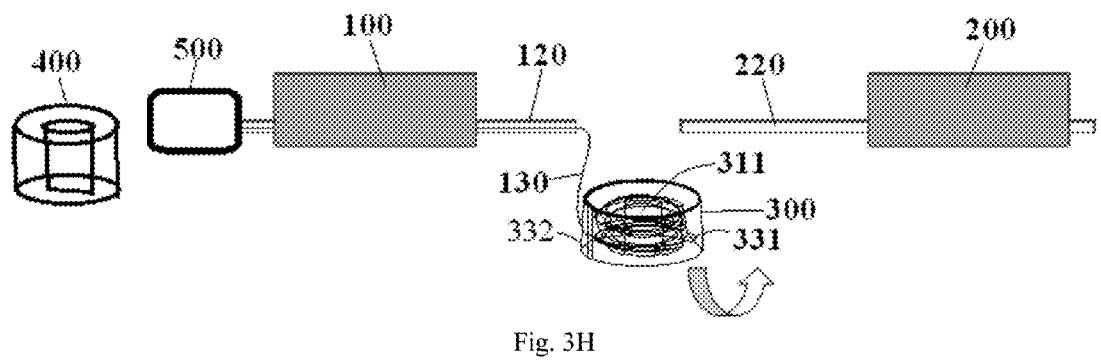
FIG. 3H is a side view of a next step of the method of laying the optical fiber into the first segment and the second segment.
Figure 3I:
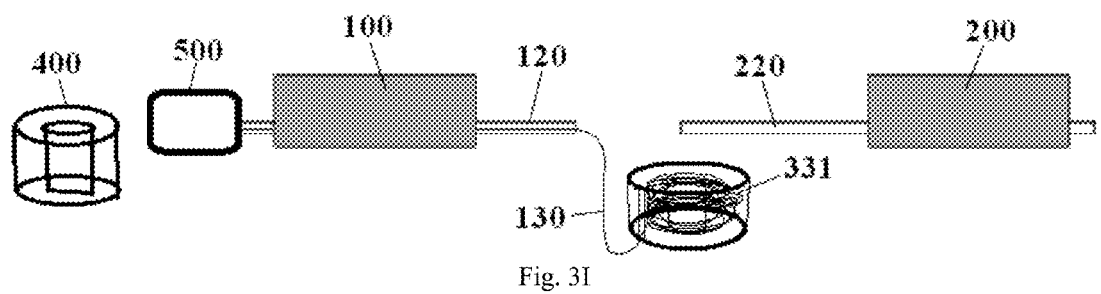
FIG. 3I is a side view of a next step of the method of laying the optical fiber into the first segment and the second segment.

Next, as shown in FIGS. 3H and 3I, the transfer apparatus 300 is turned 180° over such that the bottom of the transfer apparatus 300 faces upward.

Figure 3J:
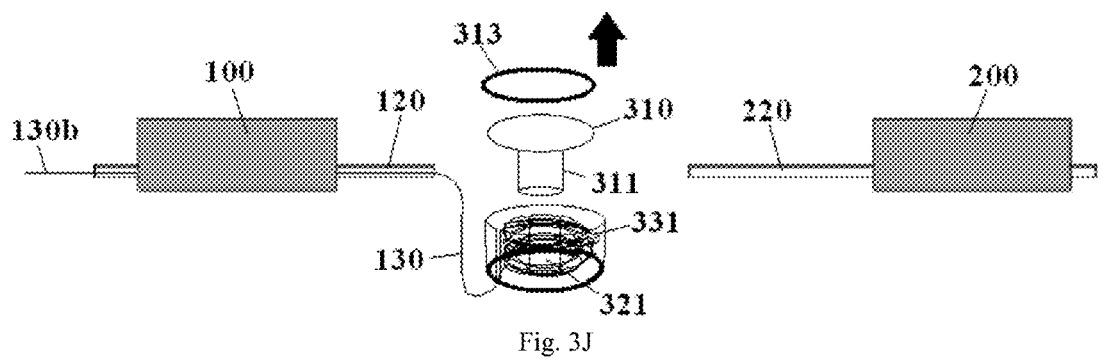
FIG. 3J is a side view of a next step of the method of laying the optical fiber into the first segment and the second segment.

Next, as shown in FIG. 3J, a lower clamping ring 313 is detached, the lower cover 310 of the transfer apparatus 300 is opened, for example, removed, from the transfer apparatus 300, and the leading end 130a of the optical fiber 130 is detached from the fiber fixation device 331 of the transfer apparatus 300.

Figure 3K:
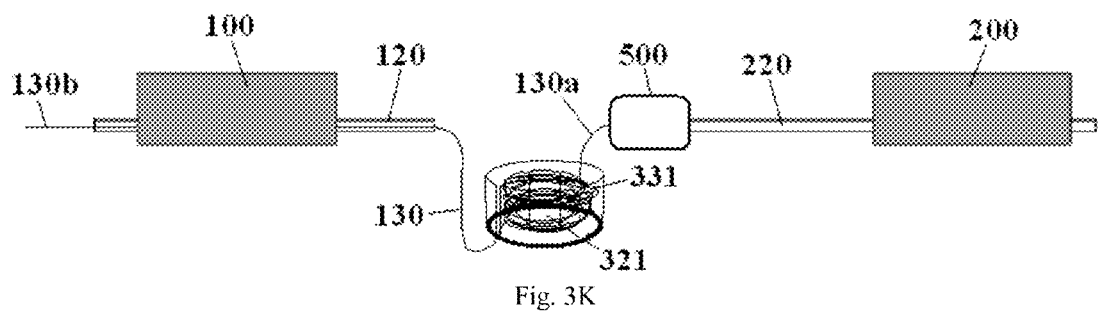
FIG. 3K is a side view of a next step of the method of laying the optical fiber into the first segment and the second segment.

Next, as shown in FIG. 3K, the remaining optical fiber 130 wound in the transfer apparatus 300 is blown into the second fiber receiving tube 220 of the second segment 200 by the air-blowing device 500.

Figure 3L:
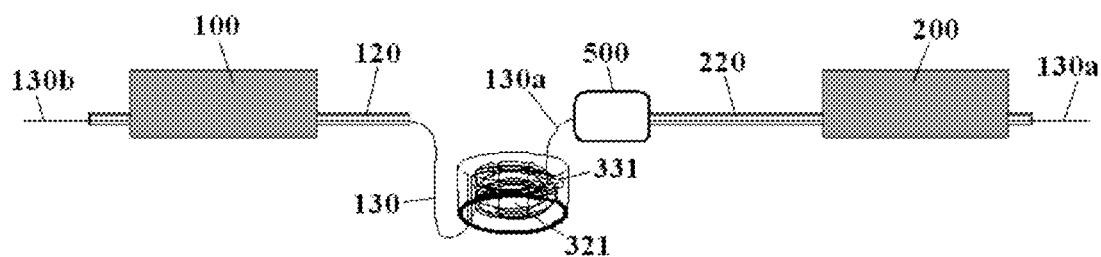
FIG. 3L is a side view of a next step of the method of laying the optical fiber into the first segment and the second segment.
Figure 3M:
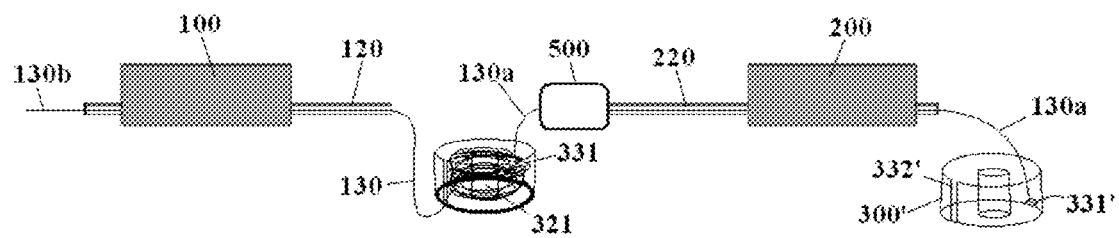
FIG. 3M is a side view of a next step of the method of laying the optical fiber into the first segment and the second segment.

Next, as shown in FIGS. 3L and 3M, the leading end 130a of the optical fiber 130 is fixed onto a fiber fixation device 331' of an additional transfer apparatus 300' after the leading end 130a of the optical fiber 130 comes out from an outlet of the second fiber receiving tube 220.

Figure 3N:
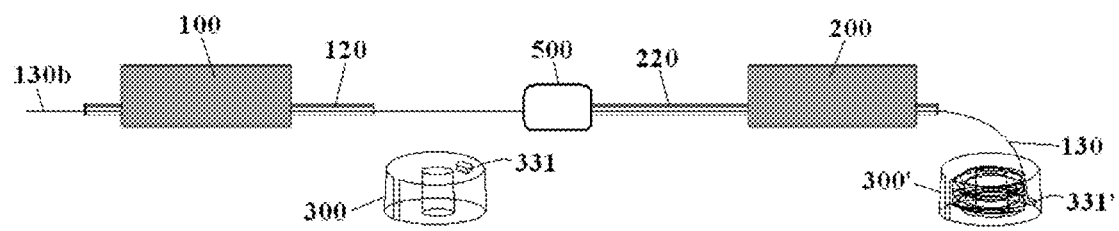
FIG. 3N is a side view of a last step of the method of laying the optical fiber into the first segment and the second segment.

Lastly, as shown in FIG. 3N, the optical fiber 130 is blown continuously into the second fiber receiving tube 220 while winding the remaining optical fiber 130 which has passed through the second fiber receiving tube 220 in the transfer apparatus 300', until the optical fiber 130 is completely laid into the second fiber receiving tube 220 of the second 200.

The steps shown in FIGS. 3F-3N are repeatedly performed such that the continuous optical fiber 130 is laid into a fiber receiving tube of a third segment (not shown), and further laid into fiber receiving tubes of the plurality of segments of optical-electrical hybrid cables.

The two fiber receiving tubes 120, 220 of the two adjacent segments 100, 200 are connected with each other by the tube connector 30 after the continuous optical fiber 130 is laid into the two fiber receiving tubes 120, 220. The power cables 110, 210 of the segments 100, 200 are electrically connected with each other by the power cable connector 40 before the optical fiber 130 is laid by the air-blowing device 500.

The air-blowing device 500 in the shown embodiment is an air compressor.

Figure 4:
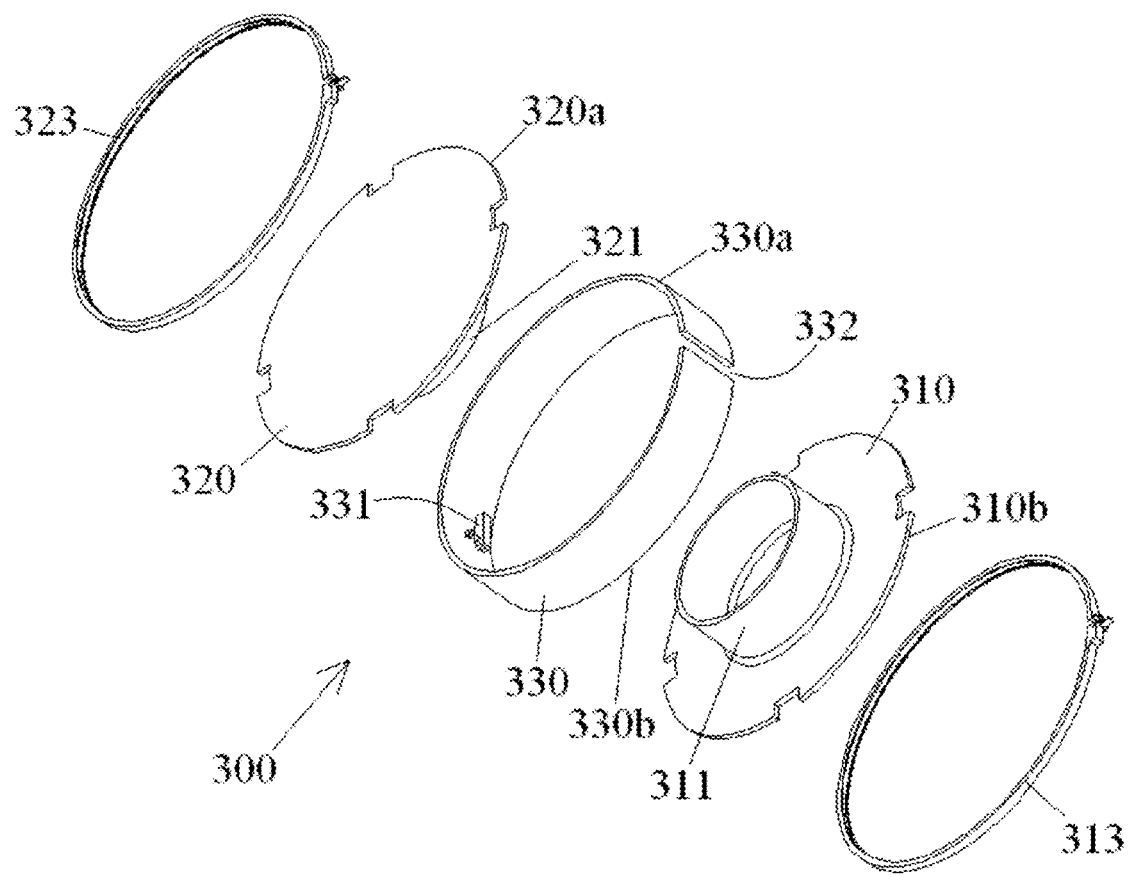
FIG. 4 is an exploded view of a transfer apparatus according to the invention.
Figure 5:
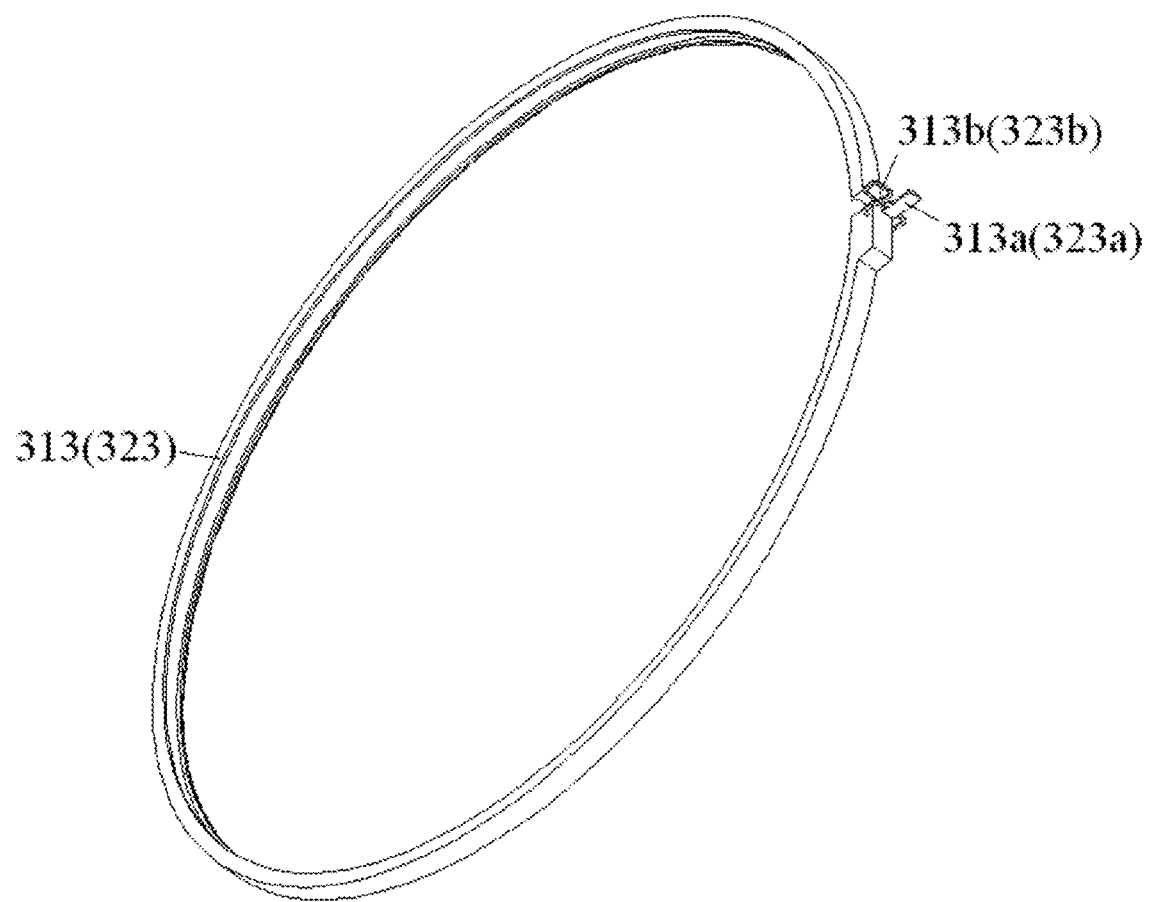
FIG. 5 is a perspective view of a clamping ring of the transfer apparatus.
Figure 6:
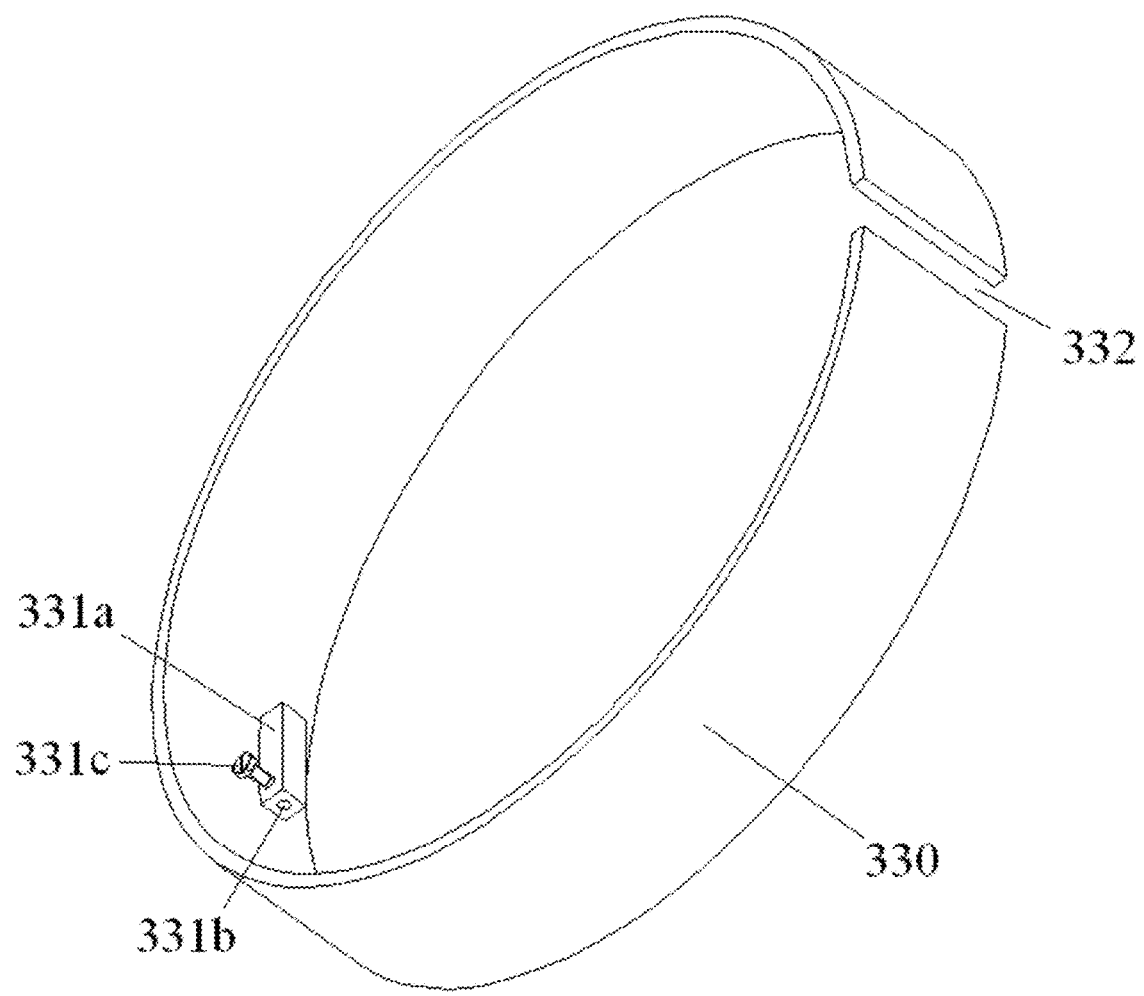
FIG. 6 is a perspective view of a cylindrical body of the transfer apparatus.

The transfer apparatus 300 is shown in greater detail in FIGS. 4-6. The transfer apparatus 300 comprises a cylindrical body 330 having an upper opening and a lower opening, an upper cover 320 configured to cover the upper opening of the cylindrical body 330, and a lower cover 310 configured to cover the lower opening of the cylindrical body 330.

As shown in FIGS. 4 and 6, the fiber fixation device 331 is disposed on an inner wall of the cylindrical body 330 so as to fix the leading end 130a of the optical fiber 130 onto the cylindrical body 330. The fiber fixation device 331 is disposed on a bottom of the inner wall of the cylindrical body 330 adjacent to the lower cover 310. A slit 332 is provided in a circumferential wall of the cylindrical body 330 such that the optical fiber 130 is capable of moving from an upper side of the cylindrical body 330 to a lower side thereof along the slit 332 when turning over the transfer apparatus 300.

As shown in FIG. 6, the fiber fixation device 331 comprises a fixation block 331a and a fixation screw 331c mounted on the fixation block 331a by a threaded connection. The fixation block 331a is provided with a fiber receiving passageway 331b therein, into which the leading end 130a of the optical fiber 130 can pass. The fixation screw 331c is screwed down tightly when the leading end 130a of the optical fiber 130 has passed into the fiber receiving passageway 331b, so that a top end of the fixation screw 331c presses the leading end 130a of the optical fiber 130 against the fiber receiving passageway 331b of the fixation block 331a and firmly fixes the leading end 130a in the fiber receiving passageway 331b. In other embodiments, the fiber fixation device 331 may be any other suitable fixation device, such as an elastic clip.

The first protrusion cylinder 311, as shown in FIG. 4, is disposed on the lower cover 310 of the transfer apparatus 300, and the optical fiber 130 is wound around the first protrusion cylinder 311 of the transfer apparatus 300. The second protrusion cylinder 321 is disposed on the upper cover 320 of the transfer apparatus 300 and configured to be inserted into a central bore of the first protrusion cylinder 311.

The upper clamping ring 323, as shown in FIG. 4, clamps a peripheral edge 320a of the upper cover 320 and a peripheral edge 330a of the upper opening of the cylindrical body 330 such that the upper cover 320 is locked to the cylindrical body 330. The lower clamping ring 313 clamps a peripheral edge 310a of the lower cover 310 and a peripheral edge 330b of the lower opening of the cylindrical body 330 such that the lower cover 310 is locked to the cylindrical body 330.

The upper clamping ring 323 and lower clamping ring 313 are shown in FIG. 5. In the shown embodiment, the upper clamping ring 323 and the lower clamping ring 313 are formed identically. Each of the upper clamping ring 323 and the lower clamping ring 313 has two ends separated from each other, which may be connected with each other by engagement structures 313a, 313b, or by engagement structures 323a, 323b. In the shown embodiment, hooks 313a, 323a are disposed on one end of the clamping rings 313, 323, respectively, and grooves 313b, 323b are disposed on the other ends of the clamping ring 313, 323, respectively. When the clamping ring 313 or 323 fits over the upper cover 320 and the cylindrical body 330 or over the lower cover 310 and the cylindrical body 330, the hook 313a or 323a may be locked to the groove 313b or 323b; the clamping ring 313 or 323 is thereby locked to the upper cover 320 and the cylindrical body 330 or to the lower cover 310 and the cylindrical body 330, and the upper cover 320 or the lower cover 310 is held on the cylindrical body 330 firmly.

Advantageously, in the method of laying an optical fiber according to various embodiments of the present invention, since the leading end of the optical fiber is fixed in the fixation device of the transfer apparatus, the optical fiber can be prevented from becoming disordered or being self-wound after the optical fiber is wound in the transfer apparatus, thereby improving quality and efficiency of laying the optical fiber.

What is claimed is:

1. A transfer apparatus for winding an optical fiber, comprising:
   a cylindrical body having a circumferential wall, an inner wall, an upper opening, and a lower opening;
   an upper cover covering the upper opening;
   a lower cover covering the lower opening;
   a fiber fixation device disposed on a bottom of the inner wall adjacent to the lower cover and fixing a leading end of the optical fiber to the cylindrical body; and
   a slit disposed in the circumferential wall of the cylindrical body whereby the optical fiber moves from an upper side of the cylindrical body to a lower side of the cylindrical body along the slit.

2. The transfer apparatus of claim 1, wherein a first protrusion cylinder is disposed on the lower cover and the optical fiber is wound around the first protrusion cylinder.

3. The transfer apparatus of claim 2, wherein a second protrusion cylinder is disposed on the upper cover, the second protrusion cylinder inserted into a central bore of the first protrusion cylinder.

4. The transfer apparatus of claim 3, further comprising an upper clamping ring clamping a peripheral edge of the upper cover and a peripheral edge of the upper opening to fix the upper cover onto the cylindrical body, and a lower clamping ring clamping a peripheral edge of the lower cover and a peripheral edge of the lower opening to fix the lower cover onto the cylindrical body.

5. The transfer apparatus of claim 4, wherein each of the upper clamping ring and the lower clamping ring has a first end and a second end separated from the first end, the first end and second end connectable by an engagement structure.

6. The transfer apparatus of claim 1, wherein the fiber fixation device includes a fixation block having a fiber receiving passageway and a fixation screw mounted on the fixation block by a threaded connection, the optical fiber fixed in the fiber receiving passageway by the fixation screw.

* * * * *